(12) United States Patent
Vickery

(10) Patent No.: US 7,382,874 B1
(45) Date of Patent: Jun. 3, 2008

(54) SHARED RECORDED DIGITAL VOICE SYSTEM

(75) Inventor: Roger D. Vickery, Waukon, IA (US)

(73) Assignee: SRDV.NET, LLC, Waukon, IA (US)

( * ) Notice: Subject to any disclaimer, the term of this patent is extended or adjusted under 35 U.S.C. 154(b) by 191 days.

(21) Appl. No.: 11/325,587

(22) Filed: Jan. 4, 2006

Related U.S. Application Data

(60) Provisional application No. 60/651,526, filed on Feb. 8, 2005.

(51) Int. Cl.
*H04M 1/03* (2006.01)
(52) U.S. Cl. ............... 379/428.02; 379/69; 455/569.1; 700/94
(58) Field of Classification Search ............... 700/94; 379/69, 428.02; 455/569.1
See application file for complete search history.

(56) References Cited

U.S. PATENT DOCUMENTS

2005/0027385 A1* 2/2005 Yueh ........................... 700/94

* cited by examiner

*Primary Examiner*—Gerald Gauthier
(74) *Attorney, Agent, or Firm*—Tipton L. Randall

(57) ABSTRACT

A telephone interface device adapted for the transmission of recorded audio files over communication channels is disclosed. The telephone interface device comprises electronic circuitry contained within a case member. The circuitry includes a plurality of electrical connection jack members, each accessible via an aperture in the case member, with each electrical connection jack member in communication with at least one control switch member mounted in an aperture in the case member and operable from exterior the case member. The plurality of electrical connection jack members includes a first jack member adapted for connection to a telephone handset, a second jack member adapted for connection to a telephone headset, a third jack member adapted for connection to input of an audio file player device, a fourth jack member adapted for connection to output of an audio file player device, a fifth jack member adapted for connection to a speaker of an audio file player device, and a sixth jack member adapted for connection to a microphone. The control switch members include a first control switch member for selectively activating or deactivating the speaker of the audio file player device, a second control switch member for selectively sending audio from the speaker of the audio file player device to the telephone handset or sending audio files directly from the audio file player device to the telephone handset, a third control switch member for selectively connecting the telephone headset to the audio file player or the telephone handset, a fourth control switch member for enabling or disabling recording of audio by the audio file player device, and a fifth control switch member for enabling or disabling the microphone. A message generated by the audio file player device from a recorded audio file is transmitted through the telephone interface device to the telephone handset connected thereto.

13 Claims, 8 Drawing Sheets

| | A | B | C | D | E | F | G |
|---|---|---|---|---|---|---|---|
| 1 | SRDV BOM | | Circuit Rev C, 6/9/2005 | | | | |
| 2 | | | | | | | |
| 3 | Ref Des | QTY | Descr | Part Number | mfgr | Vendor | vendor p/n |
| 4 | J5, J6 | 2 | Jack, 2.5mm TRS | ST-200 | | JLI | ST-200 |
| 5 | J1-J4 | 4 | Jack, 3.5mm TRS | ST-214 | | JLI | ST-214 |
| 6 | S1 | 1 | Switch 4P2T | SS-42H10 | | JLI | SS-42H10 |
| 7 | S2, S3, S5 | 1 | Switch 2P2T | SS-22F20 | | JLI | SS-22F20 |
| 8 | S4 | 1 | Switch 2P3T | SF-26F16 | | JLI | SF-26F16 |
| 9 | C1, C2 | 2 | Cap, 3.3uF/35v, Elect. 20% Case "A" | ECE-V1VS3R3SR | Panasonic | DigiKey | PCE3071TR-ND |
| 10 | C3, C4 | 2 | Cap, 10uF/16v Elect. 20% Case "A" | ECE-V1CS100SR | Panasonic | DigiKey | PCE3061TR-ND |
| 11 | R1, R2 | 2 | Res, 10K 1/4w 5% THR/SMT 0805 | ERJ-6GEYJ103V | Panasonic | DigiKey | P10KACT-ND |
| 12 | R3 | 1 | Res, 10ohm, 1/4w 5% THR/SMT 1206 | ERJ-6GEYJ100V | Panasonic | DigiKey | P10ACT-ND |
| 13 | R4 | 1 | Res, 2.2K, 1/4w 5% THR/SMT 0805 | ERJ-6GEYJ222V | Panasonic | DigiKey | P2.2KACT-ND |
| 14 | R5, R6 | 2 | Res, 22K, 1/4w 5% THR/SMT 0805 | ERJ-6GEYJ223V | Panasonic | DigiKey | P22KACT-ND |
| 15 | | | | | | | |
| 16 | C1, C2 alt | 2 | Cap, 3.3uF/35v, Elect. 20% radial | ECE-A1VKS3R3 | Panasonic | DigiKey | P978-ND |
| 17 | C3, C4 alt | 2 | Cap, 10uF/16v Elect. 20% radial | ECA-1CM100 | Panasonic | DigiKey | P5134-ND |

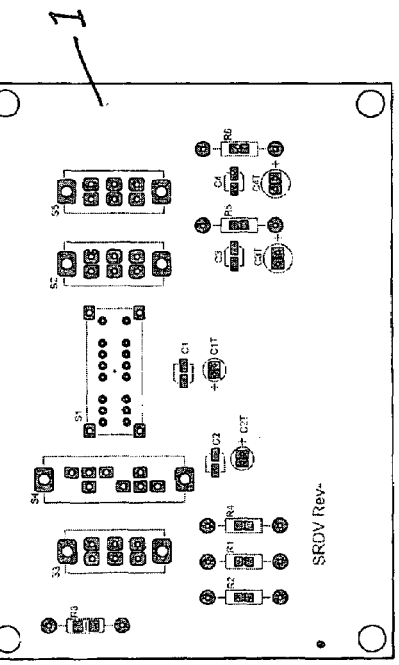

SHARED RECORDED DIGITAL VOICE SYSTEM

CROSS-REFERENCE TO RELATED APPLICATIONS, IF ANY

This application claims the benefit under 35 U.S.C. § 119 (e) of now abandoned provisional application Ser. No. 60/651,526, filed 8 Feb. 2005. Application Ser. No. 60/651,526 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a telephone interface device and system and, more particularly, to a device and system that allows the transmission of recorded audio files over communication channels, as well as facilitating the recording of audio files on a suitable medium.

2. Background Information

In present day business, the accurate transfer or sharing of recorded information is extremely important. It is important that each individual in a sales force provide consistent information to prospective buyers for any and all of your company's product lines. Although it is preferable to contact prospective buyers in person, time constraints and the high cost of travel makes telephone contact and verbal presentations an attractive alternative. In another situation, a company often needs to provide training to those employees working at remote, on-site locations. Again, consistency in the training and associated information provided to such employees is paramount. These types of situations also arise in all levels of governmental organizations as well as private or public nonprofit organizations.

Thus, there is an unmet need for a cost effective system to provide for the above-described needs for both the private and public sectors of the economy.

Applicant has devised a device and a system for the accurate transfer or sharing of recorded information using readily available communication devices in cooperation with a device that allows the transmission of recorded audio files over communication channels.

SUMMARY OF THE INVENTION

The invention is a telephone interface device adapted for the transmission of recorded audio files over communication channels. The telephone interface device comprises electronic circuitry contained within a case member. The circuitry includes a plurality of electrical connection jack members, each accessible via an aperture in the case member, with each electrical connection jack member in communication with at least one control switch member mounted in an aperture in the case member and operable from exterior the case member. The plurality of electrical connection jack members includes a first jack member adapted for connection to a telephone handset, a second jack member adapted for connection to a telephone headset, a third jack member adapted for connection to input of an audio file player device, a fourth jack member adapted for connection to output of an audio file player device, a fifth jack member adapted for connection to a speaker of an audio file player device, and a sixth jack member adapted for connection to a microphone. The control switch members include a first control switch member for selectively activating or deactivating the speaker of the audio file player device, a second control switch member for selectively sending audio from the speaker of the audio file player device to the telephone handset or sending audio files directly from the audio file player device to the telephone handset, a third control switch member for selectively connecting the telephone headset to the audio file player or the telephone handset, a fourth control switch member for enabling or disabling recording of audio by the audio file player device, and a fifth control switch member for enabling or disabling the microphone. A message generated by the audio file player device from a recorded audio file is transmitted through the telephone interface device to the telephone handset connected thereto.

The invention also includes a system for the transmission of recorded audio files over communication channels that comprises an audio file player device having an input, an output, a speaker and a microphone. The above-described telephone interface device is connected to the audio file player device and to a telephone, having both a handset and a headset, each connected to the above-described telephone interface device.

BRIEF DESCRIPTION OF THE DRAWINGS

FIG. 5A is a plan view of the printed circuit board of the shared recorded digital voice (SRDV) telephone interface device of the present invention.

FIG. 5B is a listing of the circuitry components of the printed circuit board of the shared recorded digital voice (SRDV) telephone interface device of the present invention.

DESCRIPTION OF THE EMBODIMENTS

Nomenclature

Figure 1:
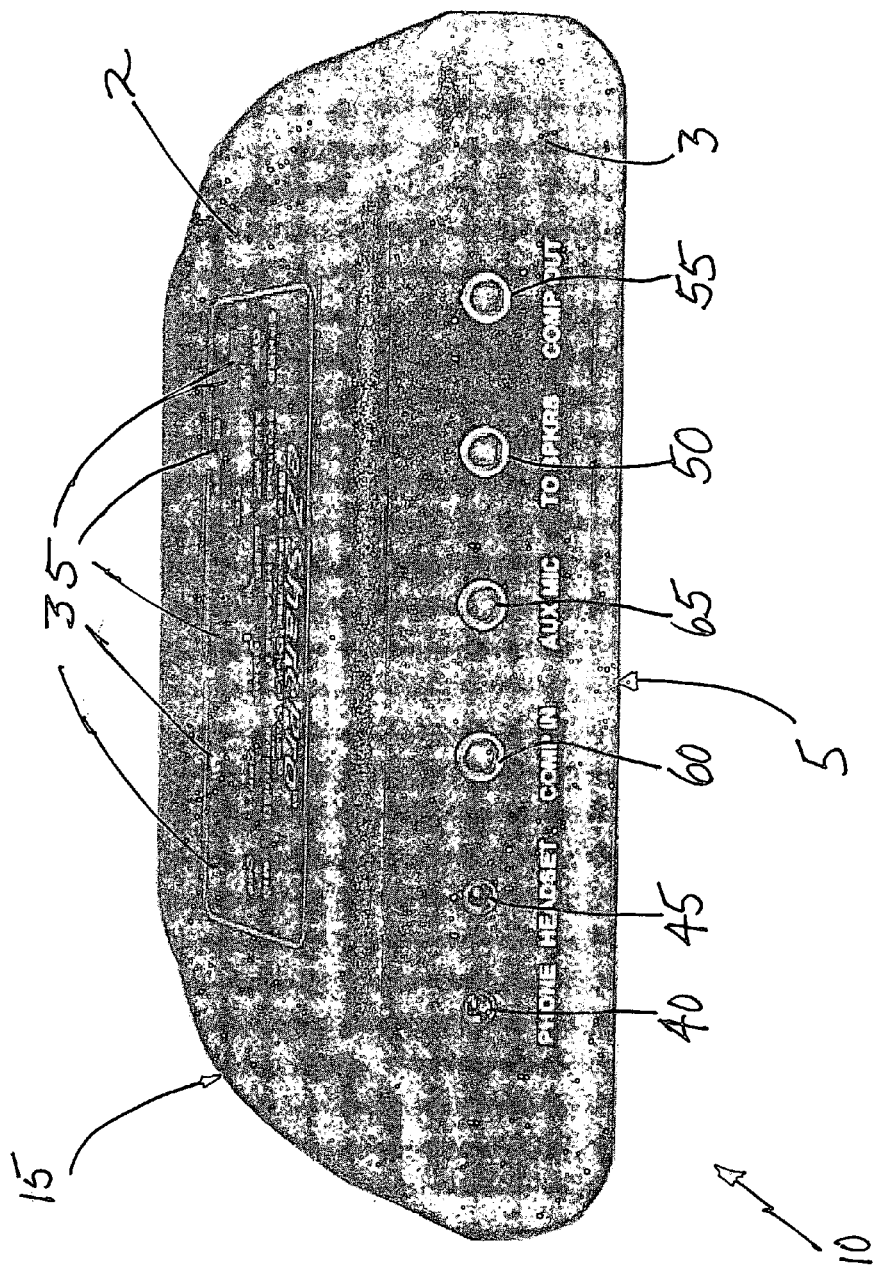
FIG. 1 is a perspective view of the shared recorded digital voice (SRDV) telephone interface device of the present invention.

| | |
|---|---|
| 1 | Printed Circuit Board Member |
| 2 | Top Portion of Case Member |
| 3 | Sidewall of Case Member |
| 4 | Mounting Threaded Fasteners for Printed Circuit Board Member |
| 5 | Bottom Portion of Case Member |
| 6 | Case Member Threaded Screw Fasteners |
| 10 | SRDV Telephone Interface Device |
| 15 | Case Member for Printed Circuit Board Member |
| 20 | Apertures in Sidewall of Case Member |
| 25 | Plug-in Electrical Jack Members of Interface Device |
| 30 | Control Switch Apertures in Top Portion of Case Member |
| 35 | Control Switch Members of Interface Device |
| 40 | Telephone Jack Member |
| 45 | Headset Jack Member |
| 50 | Speaker Jack Member |
| 55 | Computer Output Jack Member |
| 60 | Computer Input Jack Member |
| 65 | Computer Microphone Jack Member |
| 70 | Speakers Switch Member |
| 75 | Sound Selection Switch Member |
| 80 | Headset Control Switch Member |
| 85 | Record Control Switch Member |
| 90 | Headset Microphone Control Switch Member |
| 100 | Recorded Audio Files Transmission System |
| 105 | Electrical Conductor Cables |
| 110 | Telephone Handset |
| 115 | Telephone Headset |
| 120 | Audio File Player Device |
| 125 | Speaker of File Player Device |
| 130 | Microphone of File Player Device |
| 135 | Telephone Line for Audio File Player Device |

Construction

The invention is a telephone interface device adapted for the transmission of recorded audio files over communication channels. The telephone interface device comprises electronic circuitry contained within a case member. The circuitry includes a plurality of electrical connection jack members each accessible via an aperture in the case member, with each electrical connection jack member in communication with at least one control switch member mounted in an aperture in the case member and operable from exterior the case member. The plurality of electrical connection jack members includes a first jack member adapted for connection to a telephone handset, a second jack member adapted for connection to a telephone headset, a third jack member adapted for connection to input of an audio file player device, a fourth jack member adapted for connection to output of an audio file player device, a fifth jack member adapted for connection to a speaker of an audio file player device, and a sixth jack member adapted for connection to a microphone. The control switch members include a first control switch member for selectively activating or deactivating the speaker of the audio file player device, a second control switch member for selectively sending audio from the speaker of the audio file player device to the telephone handset or sending audio files directly from the audio file player device to the telephone handset, a third control switch member for selectively connecting the telephone headset to the audio file player or the telephone handset, a fourth control switch member for enabling or disabling recording of audio by the audio file player device, and a fifth control switch member for enabling or disabling the microphone. A message generated by the audio file player device from a recorded audio file is transmitted through the telephone interface device to the telephone handset connected thereto.

The telephone interface device is passive, in that the interface device requires no dedicated power supply for operation.

Figure 4:
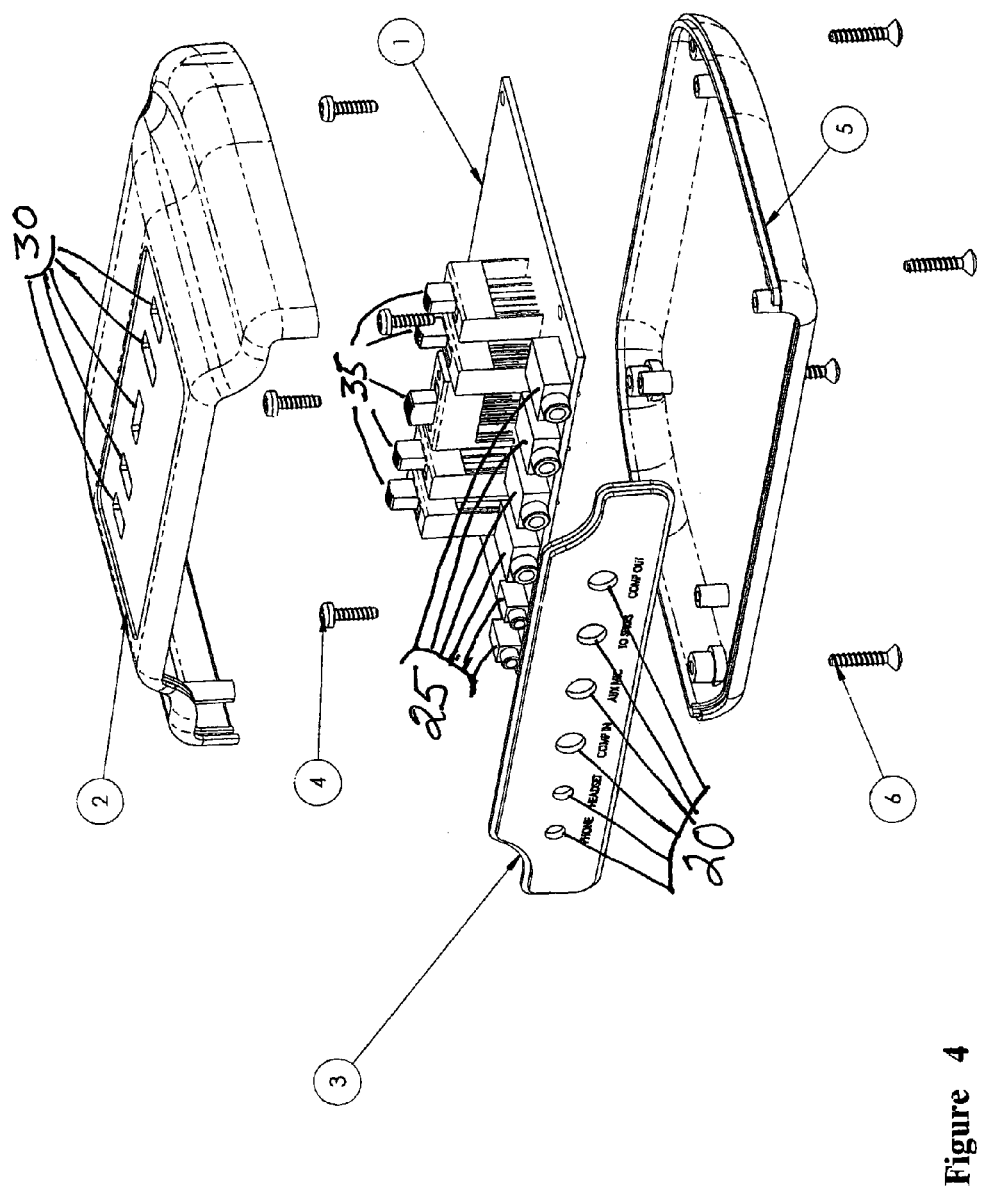
FIG. 4 is an exploded view of the shared recorded digital voice (SRDV) telephone interface device of the present invention.

The SRDV telephone interface device 10 comprises electronic circuitry mounted on a circuit board member 1. The circuitry includes a plurality of electrical jack members 25 for interfacing the circuitry with various communications devices and a plurality of control switch members 35 adapted for controlling operation of the electronic circuitry. The circuit board member 1 is mounted within a case member 15 by threaded fasteners 4, as illustrated in FIG. 4. The case member 15 includes a top portion 2, a bottom portion 5 and a sidewall portion 3, with the top portion 2 secured to the bottom portion 5 by threaded fasteners 6. The sidewall portion 3 of the case member 15 includes a plurality of apertures 20 in register with a like plurality of electrical jack members 25 of the circuitry. The sidewall apertures 20 allow an electrical conductor to be plugged into each jack member 25. The top portion 2 of the case member 25 includes a plurality of apertures 30 in register with a like plurality of control switch member 35, with each switch member 35 protruding through one of the top portion's apertures 30, and operable from exterior the case member 15.

Figure 6:
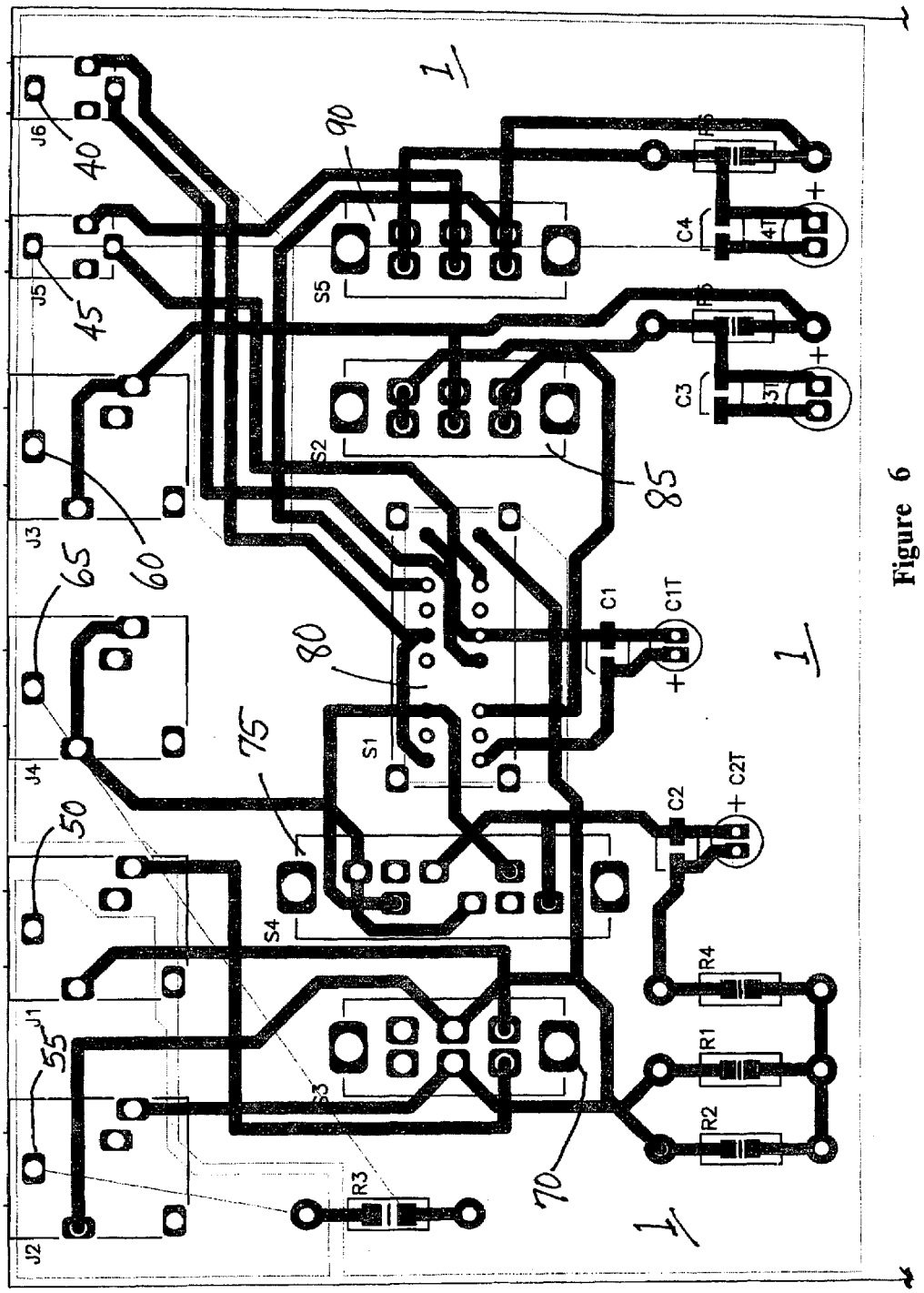
FIG. 6 is a schematic wiring diagram of the circuitry components of the printed circuit board of the shared recorded digital voice (SRDV) telephone interface device of the present invention.
Figure 7:
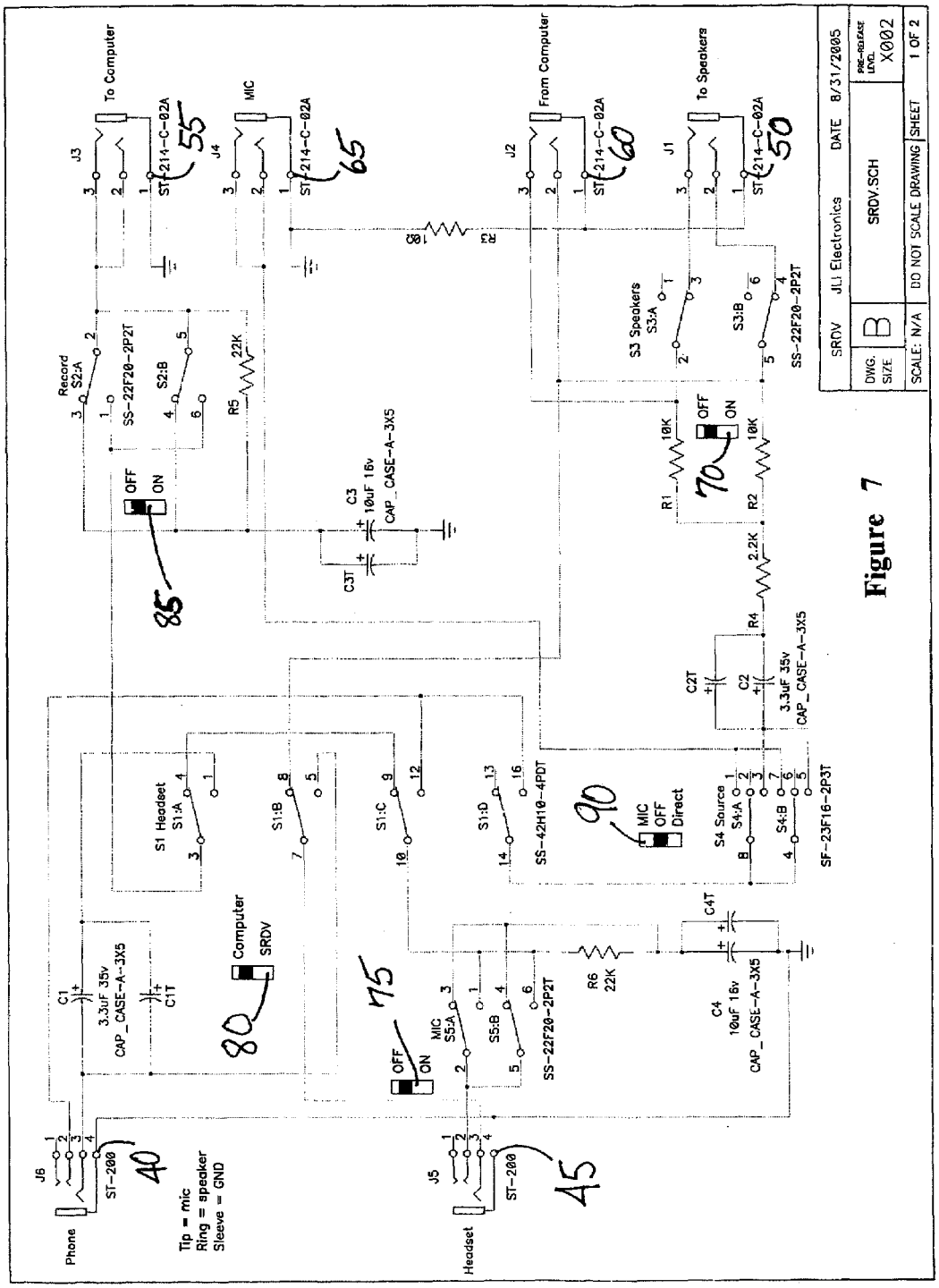
FIG. 7 is a detailed schematic wiring diagram of the circuitry components of the printed circuit board of the shared recorded digital voice (SRDV) telephone interface device of the present invention.

FIG. 5A illustrates the placement of the various circuitry components on the circuit board member 1, and FIG. 5B provides a listing of the components present in the electrical circuitry. FIG. 6 shows the actual electrical connections between the various circuitry components mounted on the circuit board member 1, while FIG. 7 is a more detailed, functional schematic diagram of the circuitry components mounted on the circuit board member 1. The telephone interface device 10 is passive, in that the interface device 10 requires no dedicated power supply for operation.

The shared recorded digital voice (SRDV) system 100 includes a telephone interface device 10 that allows the transmission of recorded audio files over communication channels, as well as facilitating the recording of audio files on a suitable medium. The telephone interface device 10 facilitates the transfer of audio files, in any format, from any playback device, using any suitable portable telephone handset or cell phone. The interface device 10 also aids in the recording of audio files on the playback device.

The shared recorded digital voice (SRDV) telephone interface device 10 provides for sharing digital recordings stored on a computer, or any other recording device (i.e., tape, digital, mp3, etc.), with another person via the telephone. The shared recorded digital voice (SRDV) telephone interface device 10 integrates all of the functions needed in one easy-to-use package. The shared recorded digital voice (SRDV) device 10 and an associated SRDV system 100 are described below in situations where the recorded audio files are available via a personal computer 120.

The shared recorded digital voice (SRDV) system 100 includes:

1.) The telephone interface device 10 of the present invention.

2.) A second phone line 135 (i.e., Teen line, Cable, DSL or wireless) is employed to play audio recorded links from an internet website.

3.) Two cables 105, shielded, with 3.5 mm stereo phone plugs on each end.

4.) One cable 105, shielded, with a 2.5 mm stereo phone plug on each end.

5.) A cordless phone or cell phone 110 having a 2.5 mm connection for an external headset.

6.) An external headset 115 that works with the cordless or cell telephone.

7.) A computer (laptop or desktop) 120 with self-powered speakers 125 and sound connections plus input and output ports.

8.) A microphone 130 suitable for connecting to the computer 120 thru the SRDV telephone interface device 10 (used for the AUX MIC).

9.) A sound source. Any sound source will work with the SRDV telephone interface device 10 if it has a speaker 125 or an output connection. Example: Go mobile with a cell phone, SRDV telephone interface device 10 and MP3 player.

10.) The software required is part of the Windows operating system of the computer 120.

Referring now to FIG. 1, the electrical jack connection members 25 in the sidewall portion 3 of the case member 15 are shown. The cable 105 with the 2.5 mm plugs connects the SRDV telephone interface device connection jack member 40 marked PHONE into the headset connection on the telephone 115. The headset cable 105 plugs into the SRDV telephone interface device connection jack member 45 marked HEADSET. The speakers input of the computer plug into the SRDV telephone interface device connection jack member 50 marked TO SPKRS. One of the cables 105 with 3.5 mm plugs connects the computer's output connection to the SRDV telephone interface device connection jack member 55 marked COMP OUT. (The output connection at the computer is usually colored green.) The remaining cable 105 connects the computer's input connection to the SRDV telephone interface device connection jack member 60 marked COMP IN. (This connection is usually colored red.) The computer microphone 130 is attached to one of the computer speakers 125 such that the microphone's sound inlet is oriented toward the face of that computer speaker 125. The computer microphone cord 105 plugs into the SRDV telephone interface device connection jack member 65 marked AUX MIC. This completes the required electrical connections.

Figure 2:
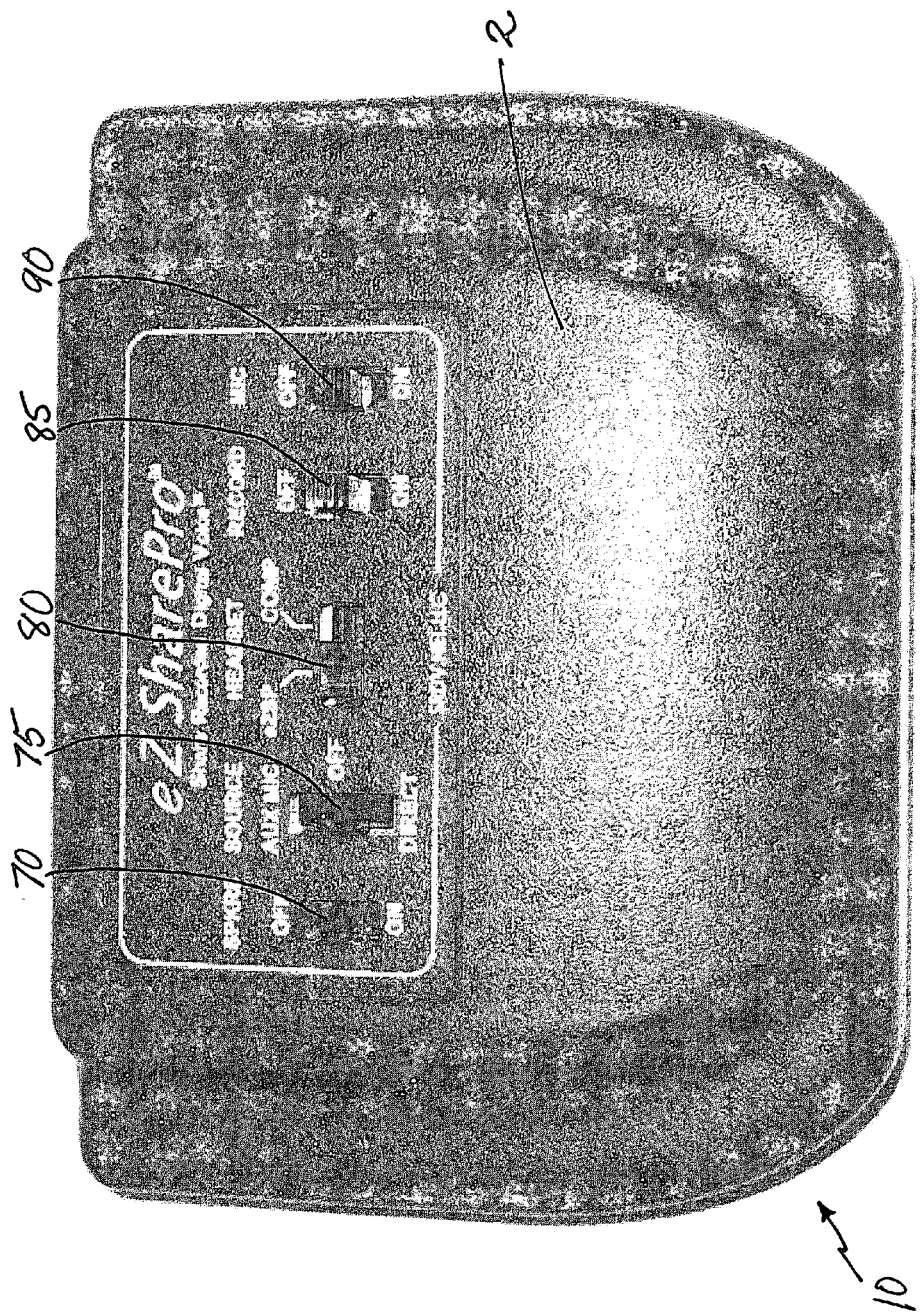
FIG. 2 is a top view of the shared recorded digital voice (SRDV) telephone interface device of the present invention.
Figure 3:
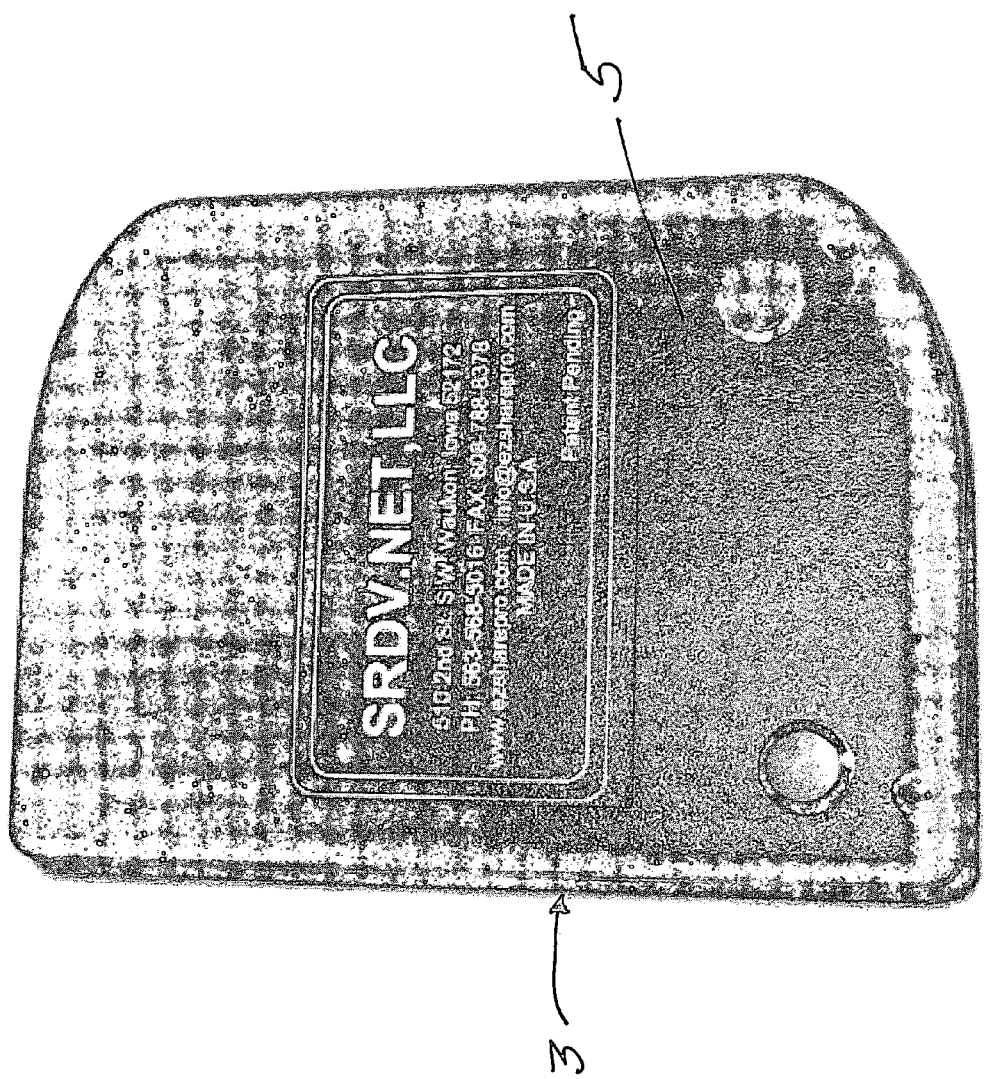
FIG. 3 is a bottom view of the shared recorded digital voice (SRDV) telephone interface device of the present invention.

Referring now to FIG. 2, the top portion 2 of the case member 15 containing the control switch members 35 is illustrated. The switch member 70 marked "SPEAKERS OFF/ON" turns the speakers off and on.

The switch member 75 marked "SOURCE-AUX MIC/OFF/DIRECT" selects the source for the sound that is sent to the telephone 110. The switch member 75 center position is OFF. The switch member 75 "AUX MIC" position sends the actual sound coming from the computer speakers 125 to the telephone 110. The speakers 125 must be turned on and turned up for this to work. Other sounds from the room may be transmitted to the listener. The switch member 75 "DIRECT" position sends the audio from the computer 120 directly to the telephone 110. The speakers 125 may be on or off. The audio level from the computer 120 determines audio volume at the listener's ear. Other sounds from the room are not transmitted to the listener unless the microphone of the headset 115 is turned on. (NOTE: The switch member 75 should remain in the middle or OFF position unless audio is being sent to the handset 110.)

The switch member 80 marked "HEADSET eZSP/COMPUTER" controls the connection of the headset 115 to the computer 120 or to the telephone handset 110 via the SRDV telephone interface device 10. When the switch member 80 is set to the COMP position, switch members 70 (SPEAKERS) and 75 (SOURCE) are disabled, while switch members 85 (MIC OFF/ON) and 90 (RECORD OFF/ON) remain functional. When the switch member 80 is set to the eZSP position, all other switch members (70, 75, 85 and 90) are functional.

The switch member 85 marked "RECORD OFF/ON" controls the audio sent from the telephone handset 110 and headset 115 to the computer 120 for recording, while the switch member 90 marked "MIC OFF/ON" turns the microphone of the headset 115 OFF or ON.

Several examples of the switch members' settings employed for various situations are illustrated below.

| Play a file for someone (direct): | | | | |
|---|---|---|---|---|
| Speakers (70) | Source (75) | Headset (80) | Record (85) | H S Mic (90) |
| OFF | Direct | eZSP | OFF | As required |

Set up the computer 120 to play the file (locate it, ensure that it will actually play, be ready to click the play button). Make the switch member settings as above, and then click the PLAY button to play back the audio file for the other person. The user can switch the headset microphone ON or OFF as needed to make comments. Use the computer's volume control to balance between the user's voice and the computer's audio.

| Play a file for someone using the AUX MIC: | | | | |
|---|---|---|---|---|
| Speakers (70) | Source (75) | Headset (80) | Record (85) | H S Mic (90) |
| ON | AUX MIC | eZSP | OFF | As required |

Set up the computer 120 to play the file (locate it, ensure that it will actually play, be ready to click the play button). Make the switch member settings as above, and then click the PLAY button to play back the audio file for the other person. The user can switch the headset microphone ON or OFF as needed to make comments. Use the computer's volume control to balance between the user's voice and the computer's audio. The speaker volume may need to be quite high.

| Use the Headset With the Computer: | | | | |
|---|---|---|---|---|
| Speakers (70) | Source (75) | Headset (80) | Record (85) | H S Mic (90) |
| As required | OFF (center position) | Comp | N/A | As required |

In this configuration, the headset microphone feeds the computer's audio input, and the computer's audio output feeds the headset's receiver/earphone. This can be done while the user is talking with someone. They'll not be disconnected; it will be as if you put them on hold. The user might do this during a conversation to confirm that a file is ready to be played to the person at the other end of the call. This configuration can be used to record your own voice using the computer. The RECORD or the MIC OFF/ON switch members allows silent switching of the microphone ON and OFF.

| Record a telephone conference call, personal testimonial, or training call: | | | | |
|---|---|---|---|---|
| Speakers (70) | Source (75) | Headset (80) | Record (85) | H S Mic (90) |
| As required | OFF | eZSP | ON | As required |

Ensure that the computer 120 is ready to record. Test readiness by switching the headset to the COMP position and talking into the headset microphone. There are controls on the computer that require access to ensure that the volume level is sufficiently high. Usually these controls are found in the Start/Programs/Accessories/Entertainment of the Windows operating system. The Sound Recorder and the Volume Control applications are required to be functional.

The SRDV telephone interface device 10 is an easy to use tool and can benefit any business or organization. The device 10 is designed specifically for assisting the business owner or sales professional in growing their client base and increasing revenues. For example, the SRDV telephone interface device 10 can be used for sharing a product presentation given by the CEO, President, or the Top Performers in a company.

The SRDV telephone interface device 10 can be used for sharing testimonials and information instantly, while on the phone with a prospect. The user no longer has to send an e-mail link and hope the prospect opens the link and listens to the information sent. Sharing information in real time and answering any questions the prospect may have right then eliminates calling a second time or waiting for the prospect to call back.

The SRDV telephone interface device 10 provides clear, crisp communication. Simply turn the switch member 75 for the SOURCE to either the DIRECT position or the AIX MIC position, and then initiate the computer audio file player, and the listener can hear the recorded information. When finished, simply turn the switch member 75 to OFF. When on the road, a laptop 120, a cell phone 110 and the SRDV telephone interface device 10, are all the tools needed to take a business mobile. The SRDV telephone interface device 10 includes a mute switch 90 for the headset microphone, which eliminates background noise while on the Moderator code during a conference call. This is currently a very real problem when several people are waiting to take part in the conference call. Any sound in the background can be heard which disrupts the call. (When in Moderator Code, the "star 6" for mute, doesn't work.)

Figure 8:
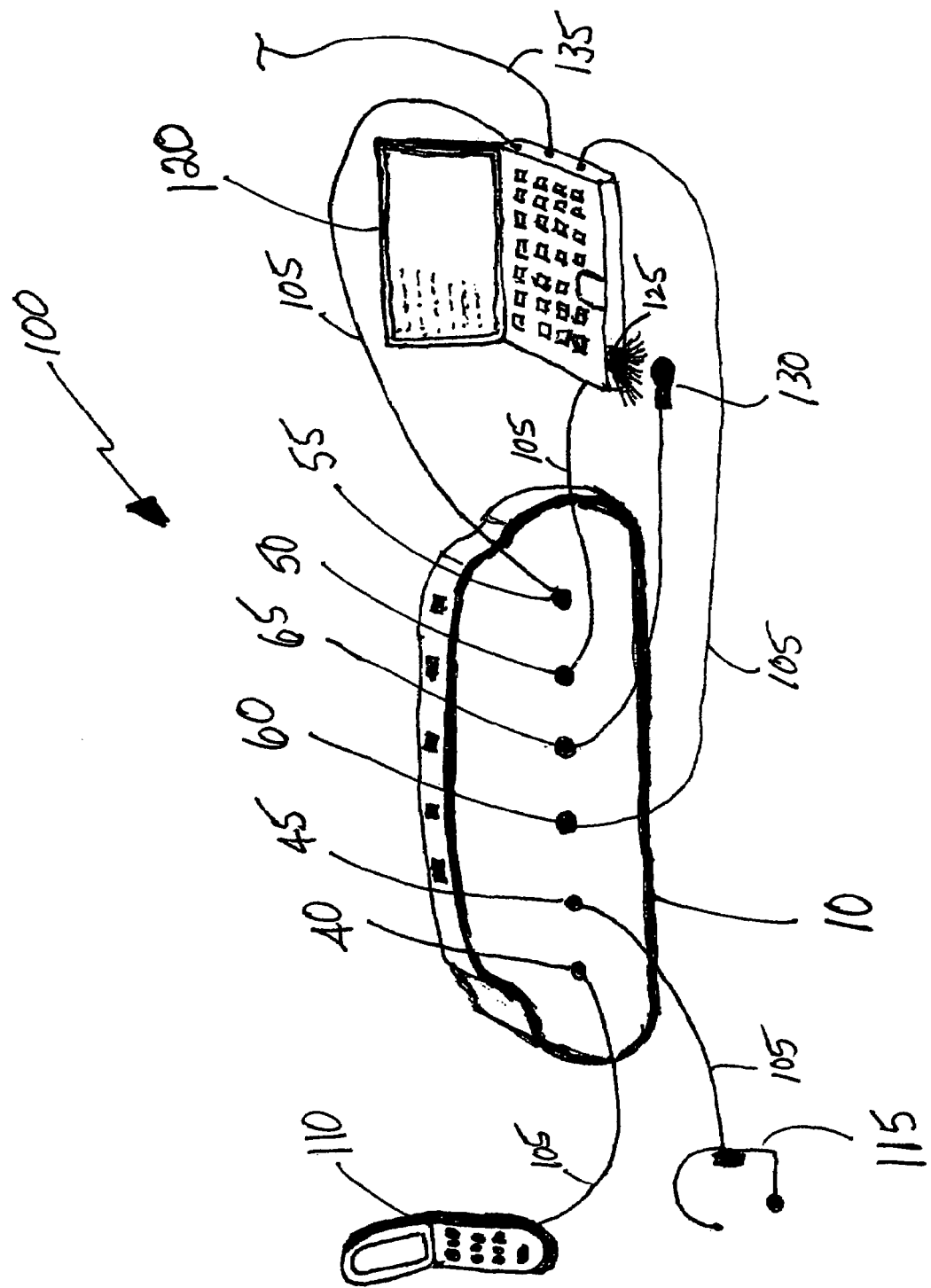
FIG. 8 is a representation of the shared recorded digital voice (SRDV) telephone interface device connected between a laptop computer and a cordless telephone having a headset.

In a further embodiment of the invention, a system 100 for the transmission of recorded audio files over communication channels is disclosed. The system comprises an audio file player device, such as a computer 120, having an input, an output, a speaker 125 and a microphone 130, a telephone 110 having a handset and an attachable headset 115 that includes a microphone and an ear speaker, and the above described telephone interface device 10. An example of the recorded audio files transmission system 100 is shown in FIG. 8. The SRDV system 100 is assembled as described in detail above.

The SRDV telephone interface device 10 is designed specifically for use with either a cordless telephone 110 or a cellular telephone 110. Because the SRDV telephone interface device 10 does not connect directly to a telephone landline, the device 10 does not fall under Part 68 of the FCC rules.

While the invention has been particularly shown and described with reference to preferred embodiments thereof, it will be understood by those skilled in the art that various changes in form and details may be made therein without departing from the spirit and scope of the invention.

I claim:

1. A telephone interface device adapted for the transmission of recorded audio files over communication channels, the telephone interface device comprising:
    electronic circuitry contained within a case member, the circuitry including a plurality of electrical connection jack members each accessible via an aperture in the case member, each electrical connection jack member in communication with at least one of a plurality of control switch members each mounted in an aperture in the case member and operable from exterior the case member;
    the plurality of electrical connection jack members including;
        a first jack member adapted for connection to a telephone handset;
        a second jack member adapted for connection to a telephone headset;
        a third jack member adapted for connection to input of an audio file player device;
        a fourth jack member adapted for connection to output of an audio file player device;
        a fifth jack member adapted for connection to a speaker of an audio file player device;
        a sixth jack member adapted for connection to a microphone;
    the plurality of control switch members including;
        a first control switch member for selectively activating or deactivating the speaker of the audio file player device;
        a second control switch member for selectively sending audio from the speaker of the audio file player device to the telephone handset or sending audio files directly from the audio file player device to the telephone handset, for transmission of audio from the audio file player device to a remote location via the telephone handset;
        a third control switch member for selectively connecting the telephone headset to the audio file player or the telephone handset;
        a fourth control switch member for enabling or disabling recording of audio by the audio file player device; and
        a fifth control switch member for enabling or disabling the microphone;
    whereby a message generated by the audio file player device from a recorded audio file is transmitted through the telephone interface device to the telephone handset connected thereto, and to a location remote to the telephone handset.

2. The telephone interface device adapted for the transmission of recorded audio files over communication channels of claim 1, wherein the third switch member includes a first position which disables the first and second switch members and a second position which enables the first, second, fourth and fifth switch members.

3. The telephone interface device adapted for the transmission of recorded audio files over communication channels of claim 1, wherein the interface device requires no dedicated power source for operation.

4. The telephone interface device adapted for the transmission of recorded audio files over communication channels of claim 1, wherein the audio file player device is selected from the group consisting of a computer, an MP3 player, a CD player; an iPOD and a tape recorder.

5. The telephone interface device adapted for the transmission of recorded audio files over communication channels of claim 1, wherein the telephone is a wireless device.

6. A system for the transmission of recorded audio files over communication channels, the system comprising;
- an audio file player device having an input, an output, a speaker and a microphone;
- a telephone having a handset and an attachable headset with microphone and ear speaker; and
- a telephone interface device comprising:
  - electronic circuitry contained within a case member, the circuitry including a plurality of electrical connection jack members each accessible via an aperture in the case member, each electrical connection jack member in communication with at least one of a plurality of control switch members each mounted in an aperture in the case member and operable from exterior the case member;
  - the plurality of electrical connection jack members including;
    - a first jack member connected by an electrical conductor to the telephone handset;
    - a second jack member connected by an electrical conductor to the telephone headset;
    - a third jack member connected by an electrical conductor to the input of the audio file player device;
    - a fourth jack member connected by an electrical conductor to the output of an audio file player device;
    - a fifth jack member connected by an electrical conductor to the speaker of an audio file player device;
    - a sixth jack member adapted connected by an electrical conductor to the microphone;
  - the plurality of control switch members including;
    - a first control switch member for selectively activating or deactivating the speaker of the audio file player device;
    - a second control switch member for selectively sending audio from the speaker of the audio file player device to the telephone handset or sending audio files directly from the audio file player device to the telephone handset, for transmission of audio from the audio file player device to a remote location via the telephone handset;
    - a third control switch member for selectively connecting the telephone headset to the audio file player or the telephone handset;
    - a fourth control switch member for enabling or disabling recording of audio by the audio file player device; and
    - a fifth control switch member for enabling or disabling the microphone;
  - whereby a message generated by the audio file player device from a recorded audio file is transmitted through the telephone interface device to the telephone handset connected thereto, and to a location remote to the telephone handset.

7. The system for the transmission of recorded audio files over communication channels of claim 6, wherein the third switch member of the telephone interface device includes a first position which disables the first and second switch members and a second position which enables the first, second, fourth and fifth switch members.

8. The system for the transmission of recorded audio files over communication channels of claim 6, wherein the interface device requires no dedicated power source for operation.

9. The system for the transmission of recorded audio files over communication channels of claim 6, wherein the audio file player device is selected from the group consisting of a computer, an MP3 player, a CD player, an iPOD and a tape recorder.

10. The system for the transmission of recorded audio files over communication channels of claim 6, wherein the telephone is a wireless device.

11. A system for the transmission of recorded audio files over communication channels, the system comprising;
- a computer device having an input, an output, a speaker and a microphone;
- a wireless telephone having a handset and an attachable headset with microphone and ear speaker; and
- a telephone interface device comprising:
  - electronic circuitry contained within a case member, the circuitry including a plurality of electrical connection jack members each accessible via an aperture in the case member, each electrical connection jack member in communication with at least one of a plurality of control switch members each mounted in an aperture in the case member and operable from exterior the case member;
  - the plurality of electrical connection jack members including;
    - a first jack member connected by an electrical conductor to the telephone handset;
    - a second jack member connected by an electrical conductor to the telephone headset;
    - a third jack member connected by an electrical conductor to the input of the audio file player device;
    - a fourth jack member connected by an electrical conductor to the output of an audio file player device;
    - a fifth jack member connected by an electrical conductor to the speaker of an audio file player device;
    - a sixth jack member adapted connected by an electrical conductor to the microphone;
  - the plurality of control switch members including;
    - a first control switch member for selectively activating or deactivating the speaker of the audio file player device;
    - a second control switch member for selectively sending audio from the speaker of the audio file player device to the telephone handset or sending audio files directly from the audio file player device to the telephone handset, for transmission of audio from the audio file player device to a remote location via the telephone handset;
    - a third control switch member for selectively connecting the telephone headset to the audio file player or the telephone handset;
    - a fourth control switch member for enabling or disabling recording of audio by the audio file player device; and
    - a fifth control switch member for enabling or disabling the microphone;
  - whereby a message generated by the audio file player device from a recorded audio file is transmitted through the telephone interface device to the telephone handset connected thereto, and to a location remote to the telephone handset.

12. The system for the transmission of recorded audio files over communication channels of claim 11, wherein the third switch member of the telephone interface device includes a first position which disables the first and second switch members and a second position which enables the first, second, fourth and fifth switch members.

13. The system for the transmission of recorded audio files over communication channels of claim 11, wherein the interface device requires no dedicated power source for operation.

* * * * *